United States Patent
Tabuchi

(10) Patent No.: US 11,082,574 B2
(45) Date of Patent: Aug. 3, 2021

(54) IMAGE FORMING APPARATUS CAPABLE OF AVOIDING MIXTURE OF PRINTS, IMAGE FORMING METHOD

(71) Applicant: KYOCERA Document Solutions Inc., Osaka (JP)

(72) Inventor: Hidehiro Tabuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/906,846

(22) Filed: Jun. 19, 2020

(65) Prior Publication Data

US 2020/0412891 A1 Dec. 31, 2020

(30) Foreign Application Priority Data

Jun. 26, 2019 (JP) .............................. JP2019-118100

(51) Int. Cl.
*G06K 15/00* (2006.01)
*H04N 1/00* (2006.01)
*H04N 1/44* (2006.01)

(52) U.S. Cl.
CPC ....... *H04N 1/00633* (2013.01); *H04N 1/0048* (2013.01); *H04N 1/00628* (2013.01); *H04N 1/4433* (2013.01)

(58) Field of Classification Search
CPC ........... H04N 1/00633; H04N 1/00628; H04N 1/0048; H04N 1/4433
See application file for complete search history.

(56) References Cited

U.S. PATENT DOCUMENTS

| | | | | |
|---|---|---|---|---|
| 2007/0166088 A1* | 7/2007 | Yokobori | ............... | B65H 39/04 399/382 |
| 2010/0290088 A1* | 11/2010 | Ito | ...................... | G03G 15/5091 358/1.16 |
| 2012/0045242 A1* | 2/2012 | Yamada | ............... | B41J 13/0036 399/85 |
| 2015/0298934 A1* | 10/2015 | Tsuji | .................. | G03G 15/6552 271/3.19 |
| 2019/0095152 A1* | 3/2019 | Kaneko | ................. | G06F 3/1274 |

FOREIGN PATENT DOCUMENTS

JP 2004251971 A 9/2004

* cited by examiner

*Primary Examiner* — Moustapha Diaby
(74) *Attorney, Agent, or Firm* — Alleman Hall Creasman & Tuttle LLP

(57) ABSTRACT

An image forming apparatus includes a plurality of discharge portions, an execution control portion, and a permission/nonpermission setting portion. The execution control portion is capable of, in a case where a print process is to be executed in a state where there are one or more sheets in a specific discharge portion that is preliminarily set from among the plurality of discharge portions, holding an execution of the print process, wherein in the print process, an image is formed on a sheet and the sheet with the image is discharged to the specific discharge portion. The permission/nonpermission setting portion sets, in response to a user operation, whether to permit or not permit holding of the execution of the print process by the execution control portion.

7 Claims, 4 Drawing Sheets

IMAGE FORMING APPARATUS CAPABLE OF AVOIDING MIXTURE OF PRINTS, IMAGE FORMING METHOD

INCORPORATION BY REFERENCE

This application is based upon and claims the benefit of priority from the corresponding Japanese Patent Application No. 2019-118100 filed on Jun. 26, 2019, the entire contents of which are incorporated herein by reference.

BACKGROUND

The present disclosure relates to an image forming apparatus for forming an image on a sheet, and an image forming method.

In an image forming apparatus such as a printer, a sheet output during a print process is discharged to a discharge portion. In addition, there is known an image forming apparatus including a plurality of discharge portions.

SUMMARY

An image forming apparatus according to an aspect of the present disclosure includes a plurality of discharge portions, an execution control portion, and a permission/nonpermission setting portion. The execution control portion is capable of, in a case where a print process is to be executed in a state where there are one or more sheets in a specific discharge portion that is preliminarily set from among the plurality of discharge portions, holding an execution of the print process, wherein in the print process, an image is formed on a sheet and the sheet with the image is discharged to the specific discharge portion. The permission/nonpermission setting portion sets, in response to a user operation, whether to permit or not permit holding of the execution of the print process by the execution control portion.

An image forming method according to another aspect of the present disclosure is executed in an image forming apparatus that includes a plurality of discharge portions. The image forming method includes: in a case where a print process is to be executed in a state where there are one or more sheets in a specific discharge portion that is preliminarily set from among the plurality of discharge portions, holding an execution of the print process, wherein in the print process, an image is formed on a sheet and the sheet with the image is discharged to the specific discharge portion; and in response to a user operation, setting whether to permit or not permit holding of the execution of the print process.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

First, a configuration of an image forming apparatus 10 according to the embodiment of the present disclosure is described with reference to FIG. 1.

The image forming apparatus 10 is a multifunction peripheral having a plurality of functions such as a scan function for reading image data from a document sheet, a print function for forming an image based on image data, a facsimile function, and a copy function. It is noted that the present disclosure is applicable to image forming apparatuses such as a printer apparatus, a facsimile apparatus, and a copier.

Figure 1:
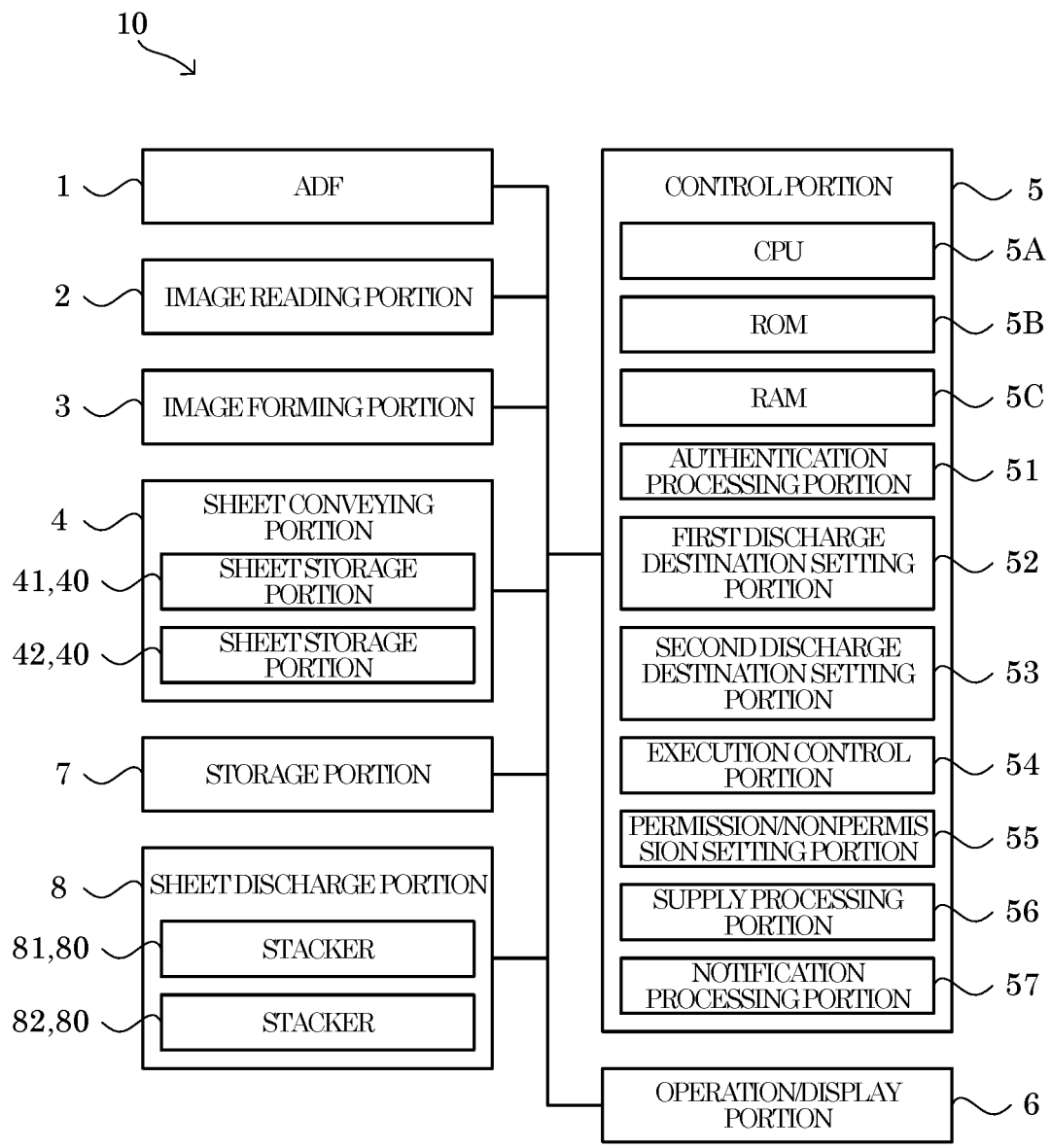
FIG. 1 is a block diagram showing a system configuration of an image forming apparatus according to an embodiment of the present disclosure.

As shown in FIG. 1, the image forming apparatus 10 includes an ADF (Auto Document Feeder) 1, an image reading portion 2, an image forming portion 3, a sheet conveying portion 4, a control portion 5, an operation/display portion 6, a storage portion 7, and a sheet discharge portion 8.

The ADF 1 includes a document sheet setting portion, a plurality of conveyance rollers, a document sheet pressing, and a document sheet discharge portion and conveys a document sheet so that it is read by the image reading portion 2.

The image reading portion 2 includes a document sheet table, a light source, a plurality of mirrors, an optical lens, and a CCD (Charge Coupled Device), and is configured to read image data from a document sheet.

The image forming portion 3 is configured to form an image on a sheet by an electrophotographic method based on image data read by the image reading portion 2, or based on image data input from an external information processing apparatus. For example, the image forming portion 3 includes a photoconductor drum, a charging roller, a laser scanning unit, a developing device, a transfer roller, a cleaning device, and a fixing device. It is noted that the image forming portion 3 may be configured to form an image on a sheet by another image forming method such as an inkjet method.

The sheet conveying portion 4 conveys a sheet on which an image is formed by the image forming portion 3. The sheet conveying portion 4 includes a sheet storage portion 41, a sheet storage portion 42, and a plurality of conveyance rollers. The sheet storage portion 41 stores sheets that are supplied to the image forming portion 3. For example, the sheets are sheet materials such as sheets of paper, sheets of coated paper, postcards, envelopes, and OHP sheets. Similar to the sheet storage portion 41, the sheet storage portion 42 stores sheets that are supplied to the image forming portion 3. The plurality of conveyance rollers are provided in a sheet conveyance path that extends from the sheet storage portions 41 and 42 to the sheet discharge portion 8 via the image forming portion 3, and convey a sheet from the sheet storage portion 41 or the sheet storage portion 42 to the sheet discharge portion 8.

Here, in the image forming apparatus 10, white sheets are stored in the sheet storage portion 41. In addition, in the image forming apparatus 10, sheets of tab paper or sheets of a color other than white are stored in the sheet storage portion 42. As described below, the sheets stored in the sheet storage portion 42 are used to distinguish, in units of jobs, prints discharged to the sheet discharge portion 8. In the following, the sheet storage portion 41 and the sheet storage portion 42 are collectively called a sheet storage portion 40.

The control portion 5 includes control equipment such as a CPU 5A, a ROM 5B, and a RAM 5C. The CPU 5A is a processor that executes various calculation processes. The ROM 5B is a nonvolatile storage device in which various information such as control programs for causing the CPU 5A to execute various processes are preliminarily stored. The RAM 5C is a volatile storage device that is used as a temporary storage memory (working area) for the various processes executed by the CPU 5A. In the control portion 5, the CPU 5A executes the various control programs preliminarily stored in the ROM 5B. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information in response to control instructions from the control portion 5. The operation portion is composed of, for example, operation keys or a touch panel through which various types of information are input to the control portion 5 in response to user operations.

The storage portion 7 is a nonvolatile storage device. For example, the storage portion 7 is a storage device such as: a nonvolatile memory such as a flash memory or an EEPROM; an SSD (Solid State Drive); or an HDD (Hard Disk Drive).

The storage portion 7 stores image data read by the image reading portion 2. In addition, the storage portion 7 stores authentication information for each of users who are registered to log in the image forming apparatus 10. The authentication information is used by the image forming apparatus 10 for authentication of a user. For example, the authentication information is composed of a user name and a password.

A sheet on which an image has been formed by the image forming portion 3 is discharged to the sheet discharge portion 8. The sheet discharge portion 8 includes a stacker 81 and a stacker 82. The stacker 81 is an option unit that can be connected to a housing of the image forming apparatus 10 or to another stacker. Similar to stacker 81, the tacker 82 is an option unit that can be connected to the housing of the image forming apparatus 10 or to another stacker. In the image forming apparatus 10, the stacker 81 is connected to the housing of the image forming apparatus 10, and the stacker 82 is connected to the stacker 81.

The stacker 81 includes a conveyance roller, a discharge roller, a carriage, and a sheet sensor. The conveyance roller conveys, to the stacker 82, a sheet that has been conveyed from the housing of the image forming apparatus 10. The discharge roller discharges, to the carriage, a sheet that has been conveyed from the housing of the image forming apparatus 10. The sheet discharged by the discharge roller is stacked on the carriage, and the carriage is configured to convey a bundle of sheets stacked thereon. For example, 5,000 thousand sheets can be stacked on the carriage. The carriage is used to convey a large number of sheets on which images have been formed by the image forming apparatus 10, to a post-processing device that is provided at a different position from the image forming apparatus 10. The sheet sensor is configured to detect whether or not a sheet is stacked on the carriage. The stacker 82 has a similar configuration to the stacker 81. Here, the stackers 81 and 82 are an example of a plurality of discharge portions of the present disclosure. In the following, the stackers 81 and 82 are collectively called a stacker 80. It is noted that the image forming apparatus 10 may include three or more stackers 80. In addition, the plurality of discharge portions of the present disclosure may be a plurality of discharge trays that are provided in the housing of the image forming apparatus 10 or in the post-processing device that can be connected to the housing.

In the image forming apparatus 10, a print process using the image forming portion 3 and the sheet conveying portion 4 is executed. An image is formed, based on image data, on a sheet supplied from a first sheet storage portion that is preliminarily set from among the two sheet storage portions 40. For example, in the image forming apparatus 10, the sheet storage portion 41 is set as the first sheet storage portion. In addition, in the print process, a sheet after image formation is discharged to a specific discharge portion that is preliminarily set from among the two stackers 80.

Meanwhile, in a conventional image forming apparatus, in a case where the print process is to be executed in a state where one or more sheets are present in the specific discharge portion, the execution of the print process may be held in order to avoid mixture of prints with those of other users. Here, a user who wants to avoid mixture of the prints with those of other users would consider such a control as desirable. On the other hand, a user who wants to execute the print process early rather than avoiding mixture of the prints would consider such a control as not desirable. However, conventional image forming apparatuses cannot respond to such contrary needs of users regarding discharge of sheets during the print process.

On the other hand, in the image forming apparatus 10 according to the embodiment of the present disclosure, as described below, it is possible to respond to such contrary needs of users regarding discharge of sheets during the print process.

Specifically, the ROM 5B of the control portion 5 preliminarily stores a print control program for causing the CPU 5A to execute a mode setting process (see the flowchart of FIG. 3) and a print control process (see the flowchart of FIG. 4) that are described below. It is noted that the print control program may be recorded on a non-transitory computer-readable recording medium such as a CD, a DVD, or a flash memory, and may be read from the recording medium and installed in the storage portion 7.

As shown in FIG. 1, the control portion 5 includes an authentication processing portion 51, a first discharge destination setting portion 52, a second destination setting portion 53, an execution control portion 54, a permission/nonpermission setting portion 55, a supply processing portion 56, and a notification processing portion 57. Specifically, the control portion 5 executes, by using the CPU 5A, the print control program stored in the ROM 5B. This allows the control portion 5 to function as the authentication processing portion 51, the first discharge destination setting portion 52, the second discharge destination setting portion 53, the execution control portion 54, the permission/nonpermission setting portion 55, the supply processing portion 56, and the notification processing portion 57.

The authentication processing portion 51 executes a log-in process to authenticate a user based on a predetermined authentication operation.

For example, the authentication processing portion 51 displays, as necessary on the operation/display portion 6, an authentication screen on which the authentication operation can be performed. The authentication processing portion 51 receives the authentication operation on the authentication screen when the operation is performed by the user. For example, the authentication operation is an operation to input a user name and a password. Subsequently, when the information input through the operation/display portion 6 matches any one piece of authentication information stored in the storage portion 7, the authentication processing portion 51 determines that the authentication is successful, and permits the user to log in the image forming apparatus 10.

It is noted that the authentication processing portion 51 executes a log-out process to log out a currently logged-in user when a predetermined log-out operation has been performed on the operation/display portion 6, when a predetermined set time has passed, or when another user needs to be logged in.

The first discharge destination setting portion 52 sets one of the two stackers 80 that has been specified by an operation of the user, as the specific discharge portion.

In a case where the print process is to be executed and any of the plurality of stackers 80 has not been specified as the specific discharge portion by a user operation, the second discharge destination setting portion 53 automatically sets one of the plurality of stackers 80 as the specific discharge portion.

Specifically, when one or both of the two stackers 80 are unused discharge portions, the second discharge destination setting portion 53 sets one of the unused discharge portions as the specific discharge portion, wherein there is no sheet in the unused discharge portions. For example, when both of the two stackers 80 are unused discharge portions, the second discharge destination setting portion 53 sets the stacker 81 as the specific discharge portion.

In addition, when neither of the two stackers 80 is an unused discharge portion, the second discharge destination setting portion 53 selects, as the specific discharge portion, a stacker 80 on which the least number of sheets are stacked. In addition, when neither of the two stackers 80 is an unused discharge portion, the second discharge destination setting portion 53 may select, as the specific discharge portion, a stacker 80 that was used last, or a preliminarily specified stacker 80.

In a case where the print process is to be executed in a state where there are one or more sheets in the specific discharge portion, the execution control portion 54 can hold an execution of the print process.

For example, the execution control portion 54 holds the execution of the print process until the sheets are collected from the specific discharge portion, or until a predetermined execution operation is performed.

The permission/nonpermission setting portion 55 sets, in response to a user operation, whether to permit or not permit holding of the execution of the print process by the execution control portion 54.

For example, the permission/nonpermission setting portion 55 sets, for each of users who are registered to log in the image forming apparatus 10, whether to permit or not permit holding of the execution of the print process by the execution control portion 54.

Figure 2:
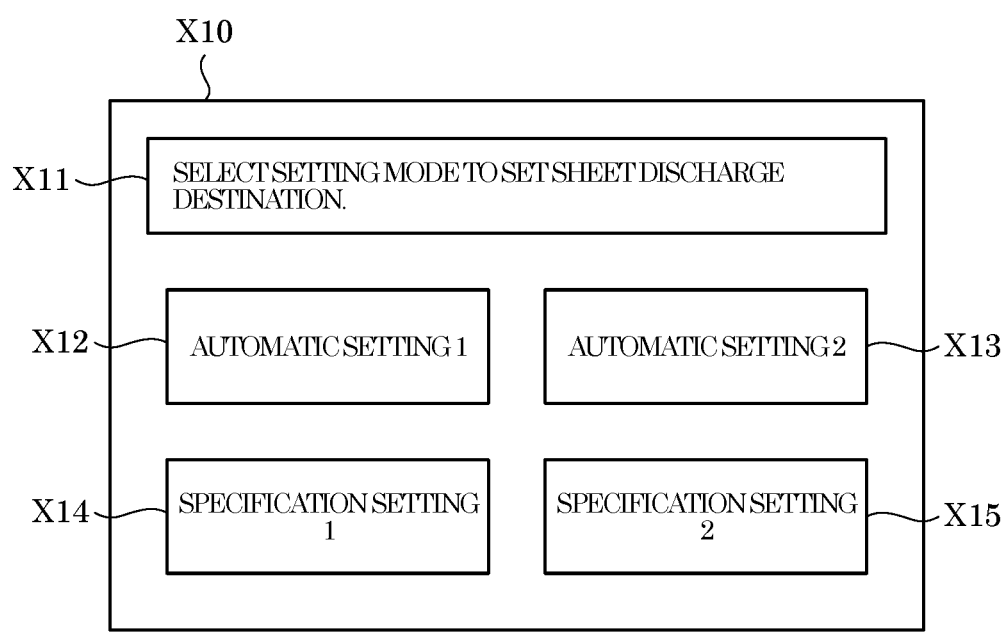
FIG. 2 is a diagram showing an example of a mode selection screen displayed in the image forming apparatus according to the embodiment of the present disclosure.

For example, in response to a user operation performed on the operation/display portion 6, the permission/nonpermission setting portion 55 displays, on the operation/display portion 6, a mode selection screen X10 shown in FIG. 2.

Here, the mode selection screen X10 is used to set whether to permit or not permit holding of the execution of the print process by the execution control portion 54, or used to specify a stacker 80 that is to be set as the specific discharge portion. The mode selection screen X10 includes a message display field X11, an operation key X12, an operation key X13, an operation key X14, and an operation key X15.

The message display field X11 displays a message to a user.

The operation key X12 is used to set that holding of the execution of the print process by the execution control portion 54 is permitted. For example, upon receiving a user operation of the operation key X12, the permission/nonpermission setting portion 55 stores, in the storage portion 7, a piece of permission information indicating that holding of the execution of the print process by the execution control portion 54 is permitted, in association with a piece of identification information of a currently logged-in user.

The operation key X13 is used to set that holding of the execution of the print process by the execution control portion 54 is not permitted. For example, upon receiving a user operation of the operation key X13, the permission/nonpermission setting portion 55 stores, in the storage portion 7, a piece of nonpermission information indicating that holding of the execution of the print process by the execution control portion 54 is not permitted, in association with the piece of identification information of the currently logged-in user.

The operation key X14 is used to set that holding of the execution of the print process by the execution control portion 54 is permitted, and to specify a stacker 80 that is to be set as the specific discharge portion. For example, upon receiving a user operation of the operation key X14, the permission/nonpermission setting portion 55 displays a specification reception screen on the operation/display portion 6 to receive a specification operation specifying a stacker 80 that is to be set as the specific discharge portion. In addition, upon receiving, on the specification reception screen, a specification operation specifying a stacker 80 that is to be set as the specific discharge portion, the permission/nonpermission setting portion 55 stores, in the storage portion 7, a piece of stacker information indicating the stacker 80 specified by the specification operation, and the piece of permission information, in association with the piece of identification information of the currently logged-in user.

The operation key X15 is used to set that holding of the execution of the print process by the execution control portion 54 is not permitted, and is used to specify a stacker 80 that is to be set as the specific discharge portion. For example, upon receiving a user operation of the operation key X15, the permission/nonpermission setting portion 55 displays the specification reception screen on the operation/display portion 6. In addition, upon receiving a specification operation specifying a stacker 80 that is to be set as the specific discharge portion, the permission/nonpermission setting portion 55 stores, in the storage portion 7, a piece of stacker information indicating the stacker 80 specified by the specification operation, and the piece of nonpermission information, in association with the piece of identification information of the currently logged-in user.

In a case where the print process is to be executed in a state where one or more sheets are present in the specific discharge portion, the supply processing portion 56, before the execution of the print process, supplies a sheet from a second sheet storage portion that is one of the two sheet storage portions 40 and is different from the first sheet storage portion. For example, in the image forming apparatus 10, the sheet storage portion 42 is the second sheet storage portion. That is, in the image forming apparatus 10, in a case where the print process is to be executed in a state where one or more sheets are present in the specific discharge portion, before the execution of the print process, a sheet of tab paper or a sheet of a color other than white is discharged from the sheet storage portion 42 to the specific discharge portion.

In a case where the execution of the print process is held by the execution control portion 54, the notification processing portion 57 notifies that the execution of the print process is held, and that one or more sheets are present in the specific discharge portion.

For example, the notification processing portion 57 displays, on the operation/display portion 6, a notification screen including a message that the execution of the print process is held, and a message that one or more sheets are present in the specific discharge portion. For example, the notification screen includes an execution instruction key used to perform the execution operation. An operation of the execution instruction key is an example of the execution operation.

It is noted that the control portion 5 may not include the authentication processing portion 51. In this case, specification of a stacker 80 and setting of whether to permit or not permit holding of the execution of the print process by the execution control portion 54 may be common to all users. In addition, the control portion 5 may not include the supply processing portion 56.

[Mode Setting Process]

Figure 3:
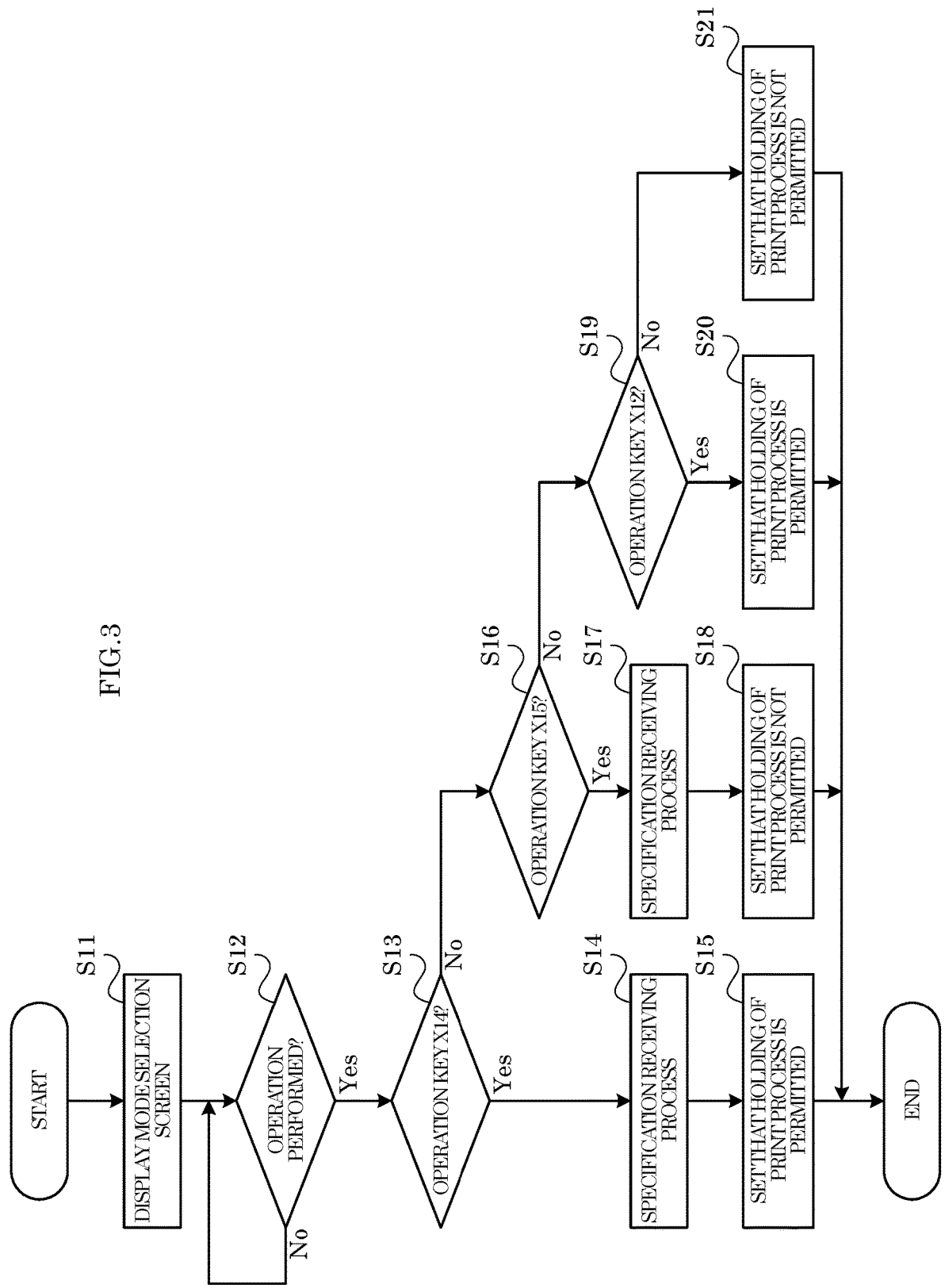
FIG. 3 is a flowchart showing an example of a mode setting process executed in the image forming apparatus according to the embodiment of the present disclosure.

In the following, with reference to FIG. 3, a description is given of an example of the procedure of the mode setting process executed by the control portion 5 in the image forming apparatus 10. Here, steps S11, S12, . . . represent numbers assigned to the processing procedures (steps) executed by the control portion 5. It is noted that the mode setting process is executed when a user operation instructing to execute the mode setting process is performed on the operation/display portion 6. Here, the mode setting process is executed by the permission/nonpermission setting portion 55 of the control portion 5.

<Step S11>

First, in step S11, the control portion 5 displays the mode selection screen X10 on the operation/display portion 6.

<Step S12>

In step S12, the control portion 5 determines whether or not any one of the operation keys X12 to X15 in the mode selection screen X10 has been operated.

Here, upon determining that any one of the operation keys X12 to X15 has been operated (Yes side at S12), the control portion 5 moves the process to step S13. In addition, upon determining that any one of the operation keys X12 to X15 has not been operated (No side at S12), the control portion 5 waits at step S12 for any one of the operation keys X12 to X15 to be operated.

<Step S13>

In step S13, the control portion 5 determines whether or not the operated operation key is the operation key X14.

Here, upon determining that the operated operation key is the operation key X14 (Yes side at S13), the control portion 5 moves the process to step S14. In addition, upon determining that the operated operation key is not the operation key X14 (No side at S13), the control portion 5 moves the process to step S16.

<Step S14>

In step S14, the control portion 5 executes a specification receiving process to receive the specification operation. Specifically, the control portion 5 displays the specification reception screen on the operation/display portion 6. In addition, upon receiving the specification operation on the specification reception screen, the control portion 5 stores, in the storage portion 7, a piece of stacker information indicating a stacker 80 specified by the specification operation, in association with a piece of identification information of the currently logged-in user. It is noted that in a case where a piece of stacker information has been stored in the storage portion 7 in association with the piece of identification information of the currently logged-in user, the control portion 5 deletes the piece of stacker information from the storage portion 7.

<Step S15>

In step S15, the control portion 5 sets that holding of the execution of the print process by the execution control portion 54 is permitted. Specifically, the control portion 5 stores, in the storage portion 7, a piece of permission information in association with the piece of identification information of a currently logged-in user. It is noted that in a case where a piece of nonpermission information has been stored in the storage portion 7 in association with the piece of identification information of the currently logged-in user, the control portion 5 deletes the piece of nonpermission information from the storage portion 7.

<Step S16>

In step S16, the control portion 5 determines whether or not the operated operation key is the operation key X15.

Here, upon determining that the operated operation key is the operation key X15 (Yes side at S16), the control portion 5 moves the process to step S17. In addition, upon determining that the operated operation key is not the operation key X15 (No side at S16), the control portion 5 moves the process to step S19.

<Step S17>

In step S17, as is the case with step S14, the control portion 5 executes the specification receiving process. It is noted that in a case where a piece of stacker information has been stored in the storage portion 7 in association with the piece of identification information of the currently logged-in user, the control portion 5 deletes the piece of stacker information from the storage portion 7.

<Step S18>

In step S18, the control portion 5 sets that holding of the execution of the print process by the execution control portion 54 is not permitted. Specifically, the control portion 5 stores, in the storage portion 7, a piece of nonpermission information in association with the piece of identification information of the currently logged-in user. It is noted that in a case where a piece of permission information has been stored in the storage portion 7 in association with the piece of identification information of the currently logged-in user, the control portion 5 deletes the piece of permission information from the storage portion 7.

<Step S19>

In step S19, the control portion 5 determines whether or not the operated operation key is the operation key X12.

Here, upon determining that the operated operation key is the operation key X12 (Yes side at S19), the control portion 5 moves the process to step S20. In addition, upon determining that the operated operation key is not the operation key X12 (No side at S19), the control portion 5 moves the process to step S21.

<Step S20>

In step S10, the control portion 5 sets that holding of the execution of the print process by the execution control portion 54 is permitted. Specifically, the control portion 5 stores, in the storage portion 7, a piece of permission information in association with the piece of identification information of the currently logged-in user. It is noted that in a case where a piece of nonpermission information has been stored in the storage portion 7 in association with the piece of identification information of the currently logged-in user, the control portion 5 deletes the piece of nonpermission information from the storage portion 7. In addition, in a case where a piece of stacker information has been stored in the storage portion 7 in association with the piece of identification information of the currently logged-in user, the control portion 5 deletes the piece of stacker information from the storage portion 7.

<Step S21>

In step S21, the control portion 5 sets that holding of the execution of the print process by the execution control portion 54 is not permitted. Specifically, the control portion 5 stores, in the storage portion 7, a piece of nonpermission information in association with the piece of identification information of the currently logged-in user. It is noted that in a case where a piece of permission information has been stored in the storage portion 7 in association with the piece of identification information of the currently logged-in user, the control portion 5 deletes the piece of permission information from the storage portion 7. It is noted that in a case where a piece of stacker information has been stored in the storage portion 7 in association with the piece of identification information of the currently logged-in user, the control portion 5 deletes the piece of stacker information from the storage portion 7.

[Print Control Process]

Figure 4:
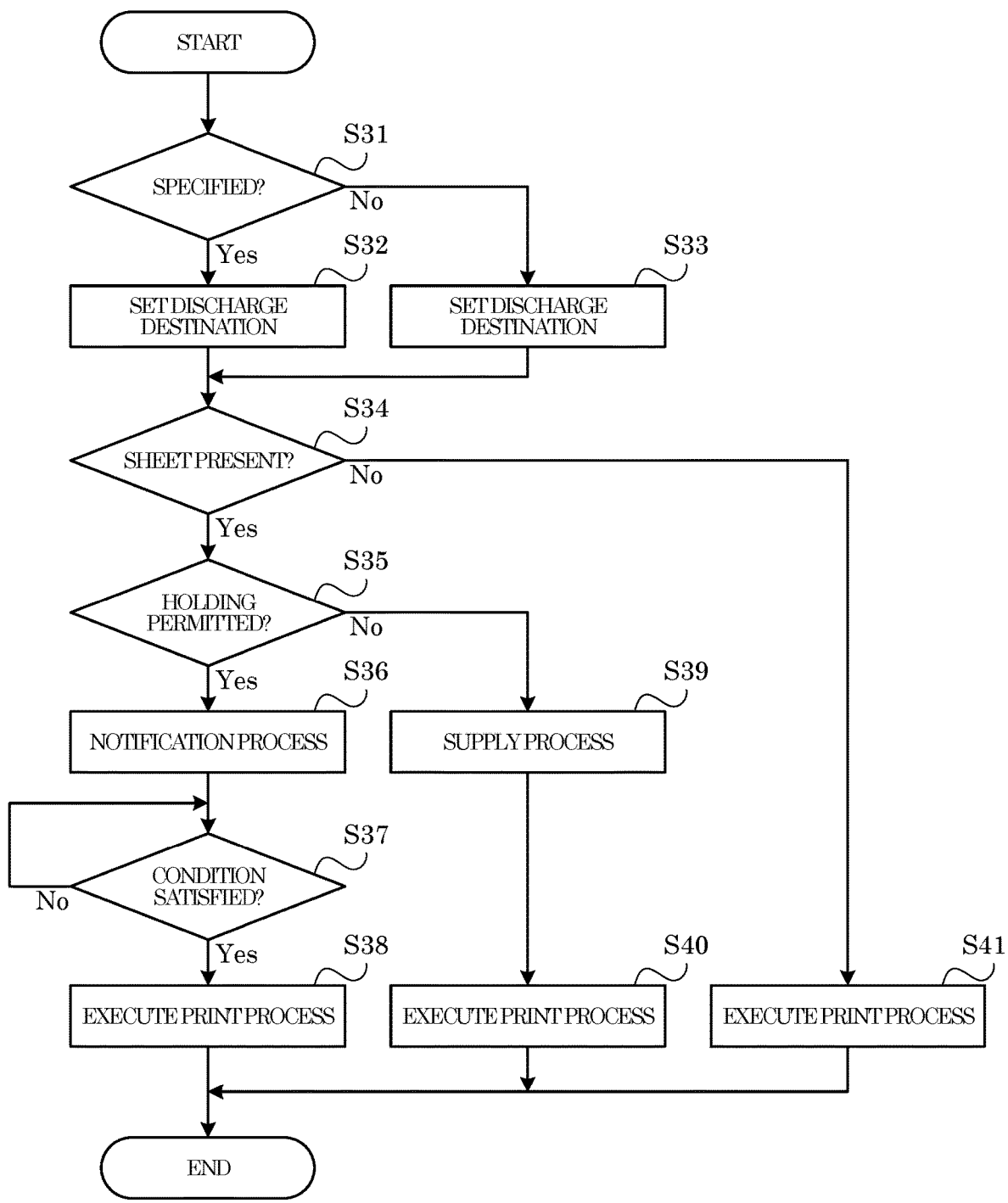
FIG. 4 is a flowchart showing an example of a print control process executed in the image forming apparatus according to the embodiment of the present disclosure.

In the following, with reference to FIG. 4, a description is given of an example of the procedure of the print control process executed by the control portion 5 in the image forming apparatus 10. It is noted that the print control process is executed when an instruction to execute the print process is input.

<Step S31>

First, in step S31, the control portion 5 determines whether or not a stacker 80 to be set as the specific discharge portion has been specified by an operation of the user.

Specifically, when a piece of stacker information has been stored in the storage portion 7 in association with a piece of identification information of a currently logged-in user, the control portion 5 determines that a stacker 80 to be set as the specific discharge portion has been specified by an operation of the user.

Here, upon determining that a stacker 80 to be set as the specific discharge portion has been specified by an operation of the user (Yes side at S31), the control portion 5 moves the process to step S32. In addition, upon determining that a stacker 80 to be set as the specific discharge portion has not been specified by an operation of the user (No side at S31), the control portion 5 moves the process to step S33.

<Step S32>

In step S32, the control portion 5 sets the stacker 80 specified by an operation of the user, as the specific discharge portion. Here, the process of step S32 is executed by the first discharge destination setting portion 52 of the control portion 5.

Specifically, the control portion 5 sets, as the specific discharge portion, the stacker 80 indicated by the piece of stacker information associated with the piece of identification information of the currently logged-in user.

<Step S33>

In step S33, the control portion 5 automatically sets any one of a plurality of stackers 80 as the specific discharge portion. Here, the process of step S33 is executed by the second discharge destination setting portion 53 of the control portion 5.

Specifically, when one or both of the two stackers 80 are unused discharge portions, the control portion 5 sets one of the unused discharge portions as the specific discharge portion. In addition, when neither of the two stackers 80 is an unused discharge portion, the control portion 5 sets, as the specific discharge portion, a stacker 80 on which the least number of sheets are stacked.

<Step S34>

In step S34, the control portion 5 determines whether or not one or more sheets are present in the specific discharge portion.

Specifically, the control portion 5 uses the sheet sensor provided in the stacker 80 set as the specific discharge portion, to determine whether or not one or more sheets are present in the specific discharge portion.

Here, upon determining that one or more sheets are present in the specific discharge portion (Yes side at S34), the control portion 5 moves the process to step S35. In addition, upon determining that no sheet is present in the specific discharge portion (No side at S34), the control portion 5 moves the process to step S41.

<Step S35>

In step S35, the control portion 5 determines whether or not holding of the execution of the print process by the execution control portion 54 is permitted.

Specifically, in a case where a piece of permission information has been stored in the storage portion 7 in association with the piece of identification information of the currently logged-in user, the control portion 5 determines that holding of the execution of the print process by the execution control portion 54 is permitted.

Here, upon determining that holding of the execution of the print process by the execution control portion 54 is permitted (Yes side at S35), the control portion 5 moves the process to step S36. In addition, upon determining that holding of the execution of the print process by the execution control portion 54 is not permitted (No side at S35), the control portion 5 moves the process to step S39.

<Step S36>

In step S36, the control portion 5 executes a notification process to notify that the execution of the print process is held, and that one or more sheets are present in the specific discharge portion. Here, the process of step S36 is executed by the notification processing portion 57 of the control portion 5.

Specifically, the control portion 5 displays the notification screen on the operation/display portion 6.

<Step S37>

In step S37, the control portion 5 determines whether or not a holding release condition is satisfied. Here, the holding release condition is a condition that sheets are collected from the specific discharge portion, or a condition that the execution operation is performed. Here, the process of step S37 is executed by the execution control portion 54 of the control portion 5.

Specifically, in a case where collection of sheets has been detected by the sheet sensor provided in the stacker 80 set as the specific discharge portion, the control portion 5 determines that the holding release condition is satisfied. In addition, in a case where the execution instruction key in the notification screen displayed in step S36 has been operated, the control portion 5 determines that the holding release condition is satisfied.

Here, upon determining that the holding release condition is satisfied (Yes side at S37), the control portion 5 moves the process to step S38. In addition, upon determining that the holding release condition is not satisfied (No side at S37), the control portion 5 waits at step S37 for the holding release condition to be satisfied.

<Step S38>

In step S38, the control portion 5 executes the print process.

<Step S39>

In step S39, the control portion 5 executes a supply process to supply a sheet from the sheet storage portion 42 that is the second sheet storage portion. Here, the process of step S39 is executed by the supply processing portion 56 of the control portion 5.

With the above-described operation, a print output during the previous print process and a print output during the current print process are distinguished from each other by the sheet supplied from the second sheet storage portion. As a result, the present configuration reduces the labor of the user to distinguish between prints respectively output during two print processes.

<Step S40>

In step S40, the control portion 5 executes the print process.

<Step S41>

In step S41, the control portion 5 executes the print process.

As described above, in the image forming apparatus 10, the user can perform an operation to set whether or not to permit holding of the execution of the print process when one or more sheets are present in the specific discharge portion. This makes it possible to respond to needs of users regarding discharge of sheets during the print process.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
    a plurality of discharge portions;
    a control portion; and
    a memory storing instructions to be executed by the control portion, the instructions comprising:
        an execution controller capable of, in a case where a print process is to be executed in a state where there are one or more sheets in a specific discharge portion that is preliminarily set from among the plurality of discharge portions, holding an execution of the print process, wherein in the print process, an image is formed on a sheet and the sheet with the image is discharged to the specific discharge portion;
        a permission/nonpermission setting portion configured to, in response to a user operation, set whether to permit or not permit holding of the execution of the print process by the execution controller; and
        a notification processing portion configured to, in a case where the execution of the print process is held by the execution controller, notify that the execution of the print process is held, and that one or more sheets are present in the specific discharge portion, wherein
    the execution controller holds the execution of the print process until the sheets are collected from the specific discharge portion, or until a predetermined operation is performed.

2. The image forming apparatus according to claim 1, wherein the instructions further comprise:
    a first discharge destination setting portion configured to set one of the plurality of discharge portions that has been specified by an operation of the user, as the specific discharge portion; and
    a second discharge destination setting portion configured to, in a case where the print process is to be executed and any of the plurality of discharge portions has not been specified as the specific discharge portion, automatically set one of the plurality of discharge portions as the specific discharge portion.

3. The image forming apparatus according to claim 2, wherein
    when one or more of the plurality of discharge portions are unused discharge portions in which there is no sheet, the second discharge destination setting portion sets one of the unused discharge portions as the specific discharge portion, and when none of the plurality of discharge portions is an unused discharge portion, the second discharge destination setting portion selects, as the specific discharge portion, a discharge portion on which a least number of sheets are stacked, or a discharge portion that was used last.

4. The image forming apparatus according to claim 1, further comprising:
    a plurality of sheet storage portions, wherein
    in the print process, an image is formed on a sheet supplied from a first sheet storage portion that is preliminarily set from among the plurality of sheet storage portions,
    wherein the instructions further comprise:
    a supply processing portion configured to, in a case where the print process is to be executed in the state where one or more sheets are present in the specific discharge portion, supply a sheet from a second sheet storage portion before the execution of the print process, the second sheet storage portion being one of the plurality of sheet storage portions and being different from the first sheet storage portion.

5. The image forming apparatus according to claim 1, wherein the instructions further comprise:
    an authentication processing portion configured to authenticate a user, wherein
    the permission/nonpermission setting portion sets, for each of users, whether to permit or not permit holding of the execution of the print process by the execution controller.

6. The image forming apparatus according to claim 1, wherein each of the plurality of discharge portions includes a carriage on which a discharged sheet is stacked, the carriage configured to convey a bundle of sheets stacked thereon.

7. An image forming method executed in an image forming apparatus that includes a plurality of discharge portions, the image forming method comprising:

in a case where a print process is to be executed in a state where there are one or more sheets in a specific discharge portion that is preliminarily set from among the plurality of discharge portions, holding an execution of the print process, wherein in the print process, an image is formed on a sheet and the sheet with the image is discharged to the specific discharge portion;

in response to a user operation, setting whether to permit or not permit holding of the execution of the print process; and in a case where the execution of the print process is held, notifying that the execution of the print process is held, and that one or more sheets are present in the specific discharge portion, wherein the execution of the print process is held until the sheets are collected from the specific discharge portion, or until a predetermined operation is performed.

* * * * *